US009910159B2

(12) United States Patent
Chan et al.

(10) Patent No.: US 9,910,159 B2
(45) Date of Patent: Mar. 6, 2018

(54) METHOD AND APPARATUS FOR PROVIDING A COMPACT EXTENDED EPHEMERIS PACKAGE FOR GNSS PROCESSING

(71) Applicant: Baseband Technologies Inc., Calgary (CA)

(72) Inventors: Billy Cheuk Wai Chan, Calgary (CA); Ossama Jamil Saleh Al-Fanek, Calgary (CA); Keith James Van Dierendonck, Calgary (CA)

(73) Assignee: Baseband Technologies Inc., Calgary AB (CA)

( * ) Notice: Subject to any disclaimer, the term of this patent is extended or adjusted under 35 U.S.C. 154(b) by 244 days.

(21) Appl. No.: 14/896,494

(22) PCT Filed: Jun. 17, 2013

(86) PCT No.: PCT/CA2013/050465
§ 371 (c)(1),
(2) Date: Dec. 7, 2015

(87) PCT Pub. No.: WO2014/201539
PCT Pub. Date: Dec. 24, 2014

(65) Prior Publication Data
US 2016/0131764 A1    May 12, 2016

(51) Int. Cl.
*G01S 19/05* (2010.01)
*B64G 1/24* (2006.01)
*B64G 3/00* (2006.01)

(52) U.S. Cl.
CPC .............. *G01S 19/05* (2013.01); *B64G 1/242* (2013.01); *B64G 3/00* (2013.01)

(58) Field of Classification Search
CPC .............................. G01S 19/05; B64G 1/242
USPC ...................................................... 342/357.42
See application file for complete search history.

(56) References Cited

U.S. PATENT DOCUMENTS

| | | | |
|---|---|---|---|
| 7,839,324 B2 | 11/2010 | Phatak et al. | |
| 8,164,518 B2 | 4/2012 | Diggelen et al. | |
| 2002/0065587 A1* | 5/2002 | Syrjrinne | G05D 1/0883 701/13 |
| 2007/0299609 A1 | 12/2007 | Garin et al. | |

(Continued)

FOREIGN PATENT DOCUMENTS

| | | |
|---|---|---|
| WO | 0116618 | 3/2001 |
| WO | 2008100351 | 8/2008 |
| WO | 2012064568 | 5/2012 |

*Primary Examiner* — Harry K Liu
(74) *Attorney, Agent, or Firm* — Adrian D. Battison; Ade & Company Inc; Ryan W. Dupuis

(57) ABSTRACT

A method and apparatus are presented for providing a compact extended ephemeris package for GNSS processing. An extended ephemeris service provides orbit trajectories and clock corrections which are predicted into the future for navigation satellites. The extended ephemeris package format used allows the ephemeris information to be sent quickly and efficiently, even when using a low bandwidth communication network. Client GNSS receiver devices obtain the extended ephemeris package and extract the satellite ephemeris information for later use. This allows a client device to operate for many days or weeks without needing to decode or receive new satellite ephemeris information.

22 Claims, 5 Drawing Sheets

(56) References Cited

U.S. PATENT DOCUMENTS

2010/0019959 A1* 1/2010 Tomita ................... G01S 19/05
                                                    342/357.395
2012/0056782 A1* 3/2012 McBurney .............. G01S 19/27
                                                     342/357.66

* cited by examiner

METHOD AND APPARATUS FOR PROVIDING A COMPACT EXTENDED EPHEMERIS PACKAGE FOR GNSS PROCESSING

FIELD OF THE INVENTION

The present invention relates to providing long-term predicted satellite ephemeris information for navigation satellites with the objectives of the invention being to reduce the amount of data that is needed to transfer a set of long-term predicted satellite ephemeris information while the loss of accuracy caused by the compression and transmission of said ephemeris information is kept to an acceptable value, and while the computational load required to decompress said ephemeris information is kept to an acceptable level.

DESCRIPTION OF RELATED ART

Global Navigation Satellite System (GNSS) receiver devices can use predicted ephemeris in place of decoded ephemeris data. This invention enables the transfer of the predicted satellite ephemeris information encoded as an extended ephemeris package and distributed to client GNSS receiver devices in a format that minimizes the required communication bandwidth along with storage and processing requirements on the client devices.

GNSS positioning and timing capabilities have become a requirement in many applications—from consumer devices such as GNSS-enabled smart phones to automated Machine-to-Machine (M2M) systems. GNSS includes the Global Positioning System (GPS) of the United States, the GLObalnaya Navigatsionnaya Sputnikovaya Sistema (GLONASS) or Global Navigation Satellite System of Russia, the Galileo system of the European Union, the BeiDou System (BDS) of China and any other similar satellite systems.

In order to calculate the global position of a device, GNSS receiver components require what may be called the ephemeris: precise information about the orbit trajectory and clock corrections for each satellite that is used. Note that in some other descriptions of the art, "ephemeris" may refer only to the orbit trajectory, excluding the clock corrections. Traditionally, a GNSS receiver obtains the ephemeris for each satellite by decoding a message broadcast by that satellite. The satellite clock correction for the required time is calculated from polynomial coefficients, such as the af0, af1, and af2 parameters included in the GPS broadcast navigation data and described in ICD-GPS-200 (Interface Control Document 200F, "Navstar GPS Space/Navigation User Segment Interfaces").

The orbital trajectory of Earth orbiting satellites are often represented as a set of orbital parameters which are valid for a specific time interval. In the ideal case, an orbiting satellite could be perfectly modelled using 6 Keplerian parameters. However, in reality, all Earth orbiting satellites are subject to external perturbing forces which prevent the satellite from travelling in a pure Keplerian orbit. Additional parameters are needed to account for perturbation forces which act on the satellite, including but not limited to gravitational anomalies from the Earth as well as gravitational forces from the Sun, Moon, and planets.

In some cases such as GNSS satellites, a total of 15 orbital parameters are used (ICD-GPS-200); of these 15 parameters, 6 are the Keplerian parameters which describe an unperturbed orbits and the other parameters account for orbital anomalies caused by perturbing forces. In circumstances where the amount of data that can be used to represent the orbit trajectory is limited, and the perturbation parameters used to model a perturbed orbit must be reduced in number and/or precision, a trade off must be made between the duration for which these parameters can accurately represent a perturbed orbital trajectory and the overall accuracy of the modelled orbit during this period.

Alternatively, the orbit trajectory may be represented in a tabular format of position coordinates, and optionally velocity and acceleration vectors, for one or more time points, such as in the GLONASS broadcast ephemeris message. The orbit trajectory may then be calculated by propagating the satellite position from one time point or interpolating between multiple time points.

Regardless of the format, it may be undesirable for a GNSS receiver to rely on the satellite broadcasts for ephemeris information. The broadcast ephemeris is transmitted at very low data rates (e.g. 50 bps for GPS), which means it can take an unacceptably long time to decode enough data to be able to use a satellite. If the received satellite signal is weak or intermittent, the required data will take even longer to be available, if ever. Even once a satellite is usable, the short validity period (e.g. 4 hours for GPS) means that the satellite may not remain usable for longer operation.

Assisted GNSS (AGNSS) or, in particular Assisted GPS (AGPS), is a technique that provides a GNSS receiver with ephemeris information from an external source. This allows the receiver to begin using GNSS signals without decoding the full broadcast ephemeris message. A traditional AGNSS receiver requires frequent updates from the service, as the ephemeris information received is only useful for the same short validity period as the satellite broadcast ephemeris.

Another alternative to decoding the current satellite broadcast ephemeris is for the GNSS receiver to use a previously stored extended ephemeris. Extended ephemeris is a technique where the satellite orbit trajectory and clock corrections are predicted well beyond the short validity interval of the live broadcast. The prediction duration often spans across many days and as long as one month. As a result, the receiver can compute the satellite position without the need of decoding the entire navigation message at the cost of reduced position accuracy over time. This reduces the Time to First Fix (TTFF) and increases the receiver signal acquisition sensitivity.

The orbit trajectory can be predicted into the future by using a force model based on orbital mechanics. The force model is applied by integrating the various acceleration components acting on the satellite over the prediction duration. By incorporating as many perturbing forces as possible, the highest level of accuracy can be achieved using this approach.

The satellite clock correction can be extrapolated into the future based on recent historical data at the time the predictions are made. The accuracy of the extrapolation relies on the quality of the satellite clock and the mathematical model used.

These ephemeris predictions require extensive data and processing resources. Since resources are limited on a mobile GNSS device, the extended ephemeris is ideally generated by an external service. This extended ephemeris service may gather the information necessary to predict the satellite orbit trajectories and clock corrections, package the information for distribution, and provide the package over a wired or wireless communication network. Then, a client device will receive the extended ephemeris package, extract the satellite orbit trajectory and clock corrections for the applicable time, and use the information for GNSS processing.

The challenge of transmitting extended ephemeris data with a prediction duration spanning several weeks is that the data size of orbit trajectories for multiple satellites may be so large that it is becomes impractical or unfeasible. Both the power consumed while receiving the data package and the local storage used at the client device can be too much for its limited resources.

WIPO published patent application 2009/065206 (Lamance) assigned to Rx Networks and published 28 May 2009 describes reducing the transmitted data size by sending information about the physical forces acting on the satellites. Then the client device uses a simplified force model to perform some of the prediction computation onboard, placing a heavy processing burden on the client device. Furthermore, attempting to limit the processing load with simpler force models can lead to increased positioning errors.

U.S. Pat. No. 7,839,324 (Phatak) assigned to SiRF Technology Inc., issued 23 Nov. 2010 describes a method of transmitting extended ephemeris information by delta-encoding a series of the Keplerian orbit models that span the entire prediction period. A drawback to this approach is that external forces acting on the satellites such as the gravity of the moon and sun cause satellites to travel in perturbed orbits. Thus, orbital parameters describing a perturbed orbit will contain harmonic and secular trends. To this end, in order to achieve a high compression ratio using differential compression, the harmonic and secular trends found in the orbital parameters needs to be removed prior to delta-encoding. For U.S. Pat. No. 7,839,324 however, the Keplerian parameters are differentially compressed without the modelling or removal of systematic trends; this reduces the efficiency of the differential compression and results in a poor data compression ratio for the extended ephemeris information.

WIPO published patent application 2012/064568 (Brown) assigned to SORCE4 published 18 May 2012 describes a method of compressing extended ephemeris information by first modeling the overall trend of a set of orbit models as described by the ICD-GPS-200 using both sinusoidal and polynomial parameters. This model is not an exact fit and cannot be used to accurately determine a satellite's position. To compensate for this, a set of correction terms are then used to capture the differences between the original orbital parameters and the trend that is described by the sinusoidal and polynomial parameters. This method is not desirable due to the fact that many correction terms need to be transmitted in combination with the sinusoidal and polynomial models; thereby increasing the total amount of data that needs to be transferred to a client device.

Therefore, a need exists for an extended ephemeris service and client device that uses a data package format which has a small size for distribution, maintains position accuracy requirements, and can be utilized at the client device without a heavy processing burden.

SUMMARY OF THE INVENTION

According to the invention, there is provided a method for encoding an extended satellite orbit trajectory comprising:

representing the orbit trajectory as a series of orbit segments wherein each orbit segment is described by a set of orbital parameters valid for an orbit segment interval;

creating for each orbital parameter a series of points representing the values that said parameter takes at all times T at which the parameter is applicable for an orbit segment;

performing for each orbital parameter a plurality of curve fits over the series of points for said parameter wherein each curve fit is performed on a set of N points where N is no less than 2 and no greater than 8, and where each curve fit results in a set of M coefficients where M is no less than 2 and no greater than 8;

forming for the said coefficients, M series of curve fit coefficients such that all instances of the same coefficient generated from each of the sets of N points is grouped into the same series;

and carrying out an encoding step for encoding each series of curve fit coefficients with compression.

Preferably each of the series of curve fit coefficients is compressed with differential compression.

Preferably the relative times between the points of any one of the sets of N points is the same as the relative times between the points of all of the other sets of N points.

Preferably for any two of the sets of N points, the time difference between the first point of each set can be expressed as $L*T_{orb} \pm (0.25*T_{orb})$, where L is an integer and $T_{orb}$ is the orbital period of the satellite.

Preferably for any two of the sets of N points, the time difference between the first point of each set can be expressed as $L*T_{orb} \pm (0.1*T_{orb})$, where L is an integer and $T_{orb}$ is the orbital period of the satellite.

Preferably for any two of the sets of N points, the time difference between the first point of each set can be expressed as $L*T_{orb}$, where L is an integer and $T_{orb}$ is the orbital period of the satellite.

Preferably one of the characteristics of the encoding step includes the ability to recursively compute a set of polynomials or the ability to use predefined polynomials.

Preferably the encoding step uses Chebyshev, Legendre, Hermite, or Laguerre polynomials.

Preferably for the curve fits of orbital parameters over time, a number of mathematical models can be used either individually as standalone functions or in combination with multiple functions.

Preferably the models include polynomial, spline, rational, and trigonometric functions in the time domain.

Preferably in the frequency domain, wavelets and Fourier series can also be used.

Preferably the Whittaker-Shannon interpolation method can be used to represent the behaviour of a given orbit parameter in the frequency domain.

Preferably one or more orbital parameters are modelled as multiple sets of coefficients of orthogonal basis functions.

Preferably the orthogonal basis functions are Chebyshev polynomials.

Preferably the curve fit coefficients and predicted clock corrections are encoded using a variable number of encoding bits to adjust the range of values to the orbit trajectory being modelled.

Preferably the curve fit coefficients and predicted clock corrections have a variable precision so as to provide different precisions each of which meets a defined service level.

Preferably the orbital parameters are in the form of parameters as described by the ICD-GPS-200, or a subset thereof.

Preferably the satellite is one of a plurality of satellites which are arranged for GNSS processing.

Preferably the method defined above is used in a method for providing a compact extended ephemeris package for a satellite, comprising:

obtaining for said satellite orbit trajectory and clock corrections predicted into the future;

and encoding each orbit trajectory using the method of any one of claims 1 to 18 along with the clock corrections into an extended ephemeris package for distribution to client devices.

Preferably the extended ephemeris package from the extended ephemeris service is provided to a plurality of client devices, including the further steps comprising:

decoding the curve fit coefficients and predicted clock corrections from the extended ephemeris package;

computing the orbital parameters from the decoded curve fit coefficients, where the orbital parameters are from orbit segments applicable to a time of interest;

and converting the orbital parameters and clock corrections for the time of interest into an ephemeris.

According to a further aspect of the invention there is provided an apparatus comprising a client device which uses a compact extended ephemeris package for a plurality of satellites comprising:

a component for receiving the extended ephemeris package wherein the package contains extended satellite orbit trajectory encoded by the method as defined above;

a component for decoding the encoded extended satellite orbit trajectory;

a component for computing the orbital parameters from the decoded extended satellite orbit trajectory, where the orbital parameters are from orbit segments applicable to a time of interest;

and a component for converting the orbital parameters and clock corrections for the time of interest into an ephemeris.

The data compression technique described herein is not confined to orthogonal basis functions but can work with a wide range of polynomial, trigonometric, and spline functions. Moreover, the data compression can be done in both the time domain as well as frequency domain using Fourier series and wavelets.

The disclosure herein uses as one example orthogonal basis functions but also this can be generalized so that other functions can also be used. The following supporting information sets out the design decisions that went into the selection of the method defined herein.

The term orbital parameter refers to any parameter that describes the orbital trajectory of a satellite and is not strictly confined to those described by the ICD-GPS-200. To this end, orbital parameters may also include subsets of the ICD-GPS-200 ephemeris parameters, GLONASS ICD ephemeris parameters and any subset thereof, additional parameters that maybe used in combination with said ICD-GPS-200 and GLONASS ICD ephemeris parameters to describe the orbital trajectory of a satellite, and any other parameters used to describe the orbital trajectory of a satellite.

Also, the invention herein can further be applied to satellites not originally intended for navigation, if orbit trajectory and clock corrections can be calculated for those satellites; these satellites may include the Iridium, Globalstar, and Orbcomm satellite constellations. In such instances, the extended ephemeris information for telecommunication satellites can be used to reduce the time needed to acquire telecommunication signals. These telecommunication signals can be used for conventional telecommunication applications such as data transfer as well as unconventional navigation applications using signals of opportunity.

DETAILED DESCRIPTION

Figure 1:
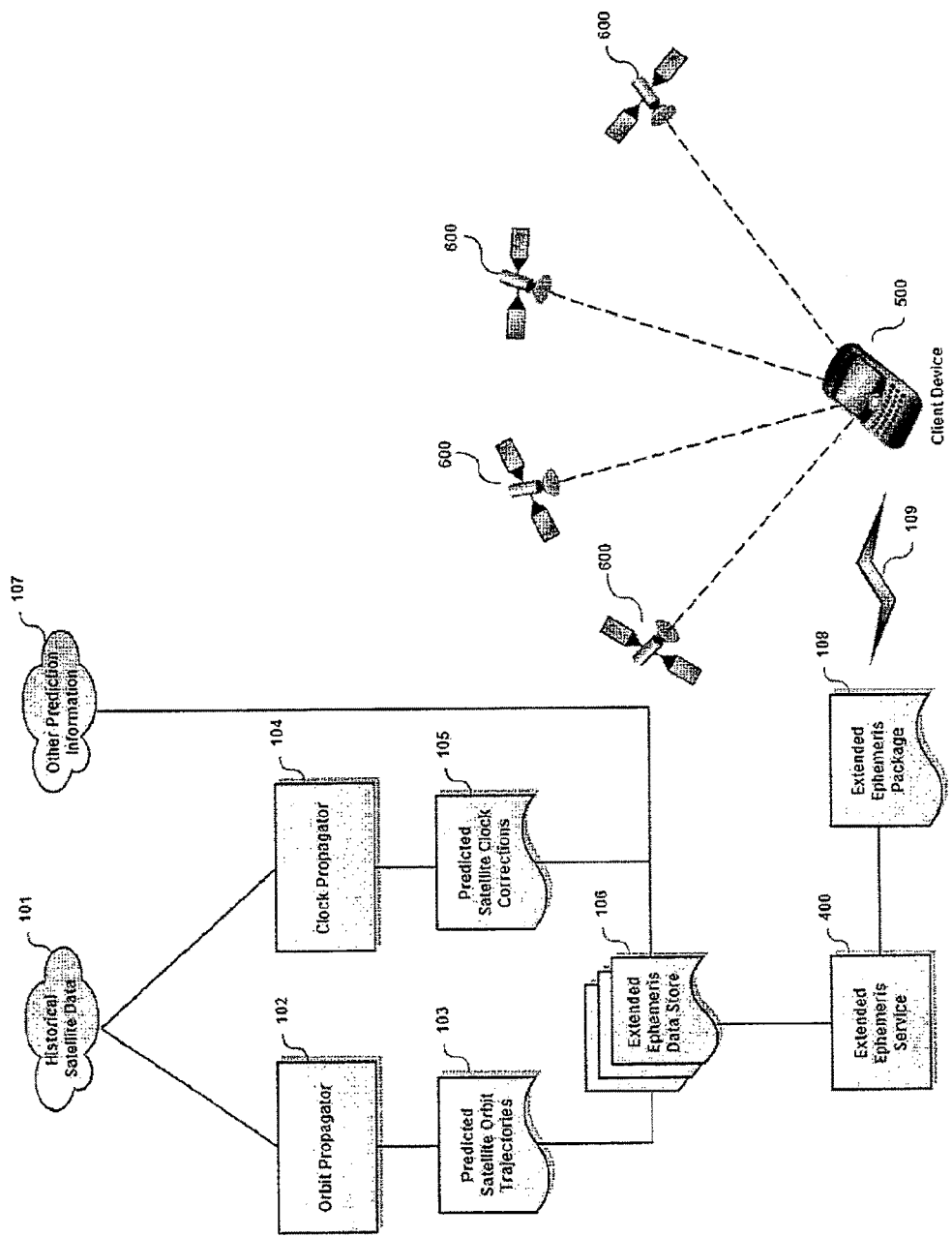
FIG. 1 shows the general arrangement of encoding and distribution of an extended satellite orbit trajectory in which the present invention is used.

Methods and apparatus of a preferred embodiment for providing a compact extended ephemeris package for GNSS processing are described hereinafter and explained with reference to the figures. This embodiment is used as an example for the present invention and does not exclude other embodiments. The embodiment comprises an extended ephemeris service to generate a compact extended ephemeris package which is distributed over a wired or wireless communication network, and one or more client devices which obtain the extended ephemeris package to be used for GNSS processing. FIG. 1 shows one possible embodiment of the present invention.

One or more input sources may provide predicted ephemeris information for some number of days into the future (for example, 1, 3, 7, 14, or 28 days). Historical satellite data 101 may be in the form of satellite tracking data or estimates of the satellite position and clock corrections. The historical satellite data may be used by an orbit propagator 102 to calculate predicted satellite orbit trajectories 103 over the prediction duration. The historical satellite data 101 may also be used by a clock propagator 104 to calculate predicted satellite clock corrections 105 over the prediction duration.

One or more data stores, hereinafter collectively referred to as the extended ephemeris data store 106, may collect the predicted satellite orbit trajectories 103, predicted satellite clock corrections 105, and optionally other prediction information 107 such as, but not limited to, satellite velocity, ionospheric model coefficients, satellite health information, and time group delay.

In this embodiment, the orbit and clock propagation may be performed by the extended ephemeris service provider. In an alternative embodiment, a third-party provider may generate the propagated orbits, clock corrections, or both and supply this information to the extended ephemeris data store 106.

An extended ephemeris service 400 may comprise one or a network of servers to encode the information from the extended ephemeris data store 106 into a compact extended ephemeris package 108, and distribute the package to one or more client devices 500 through a communication medium 109. A client device 500 may include a GNSS process which calculates position from the decoded extended ephemeris information and the signals from satellites 600.

Compressing Satellite Orbit Trajectories

Figure 2:
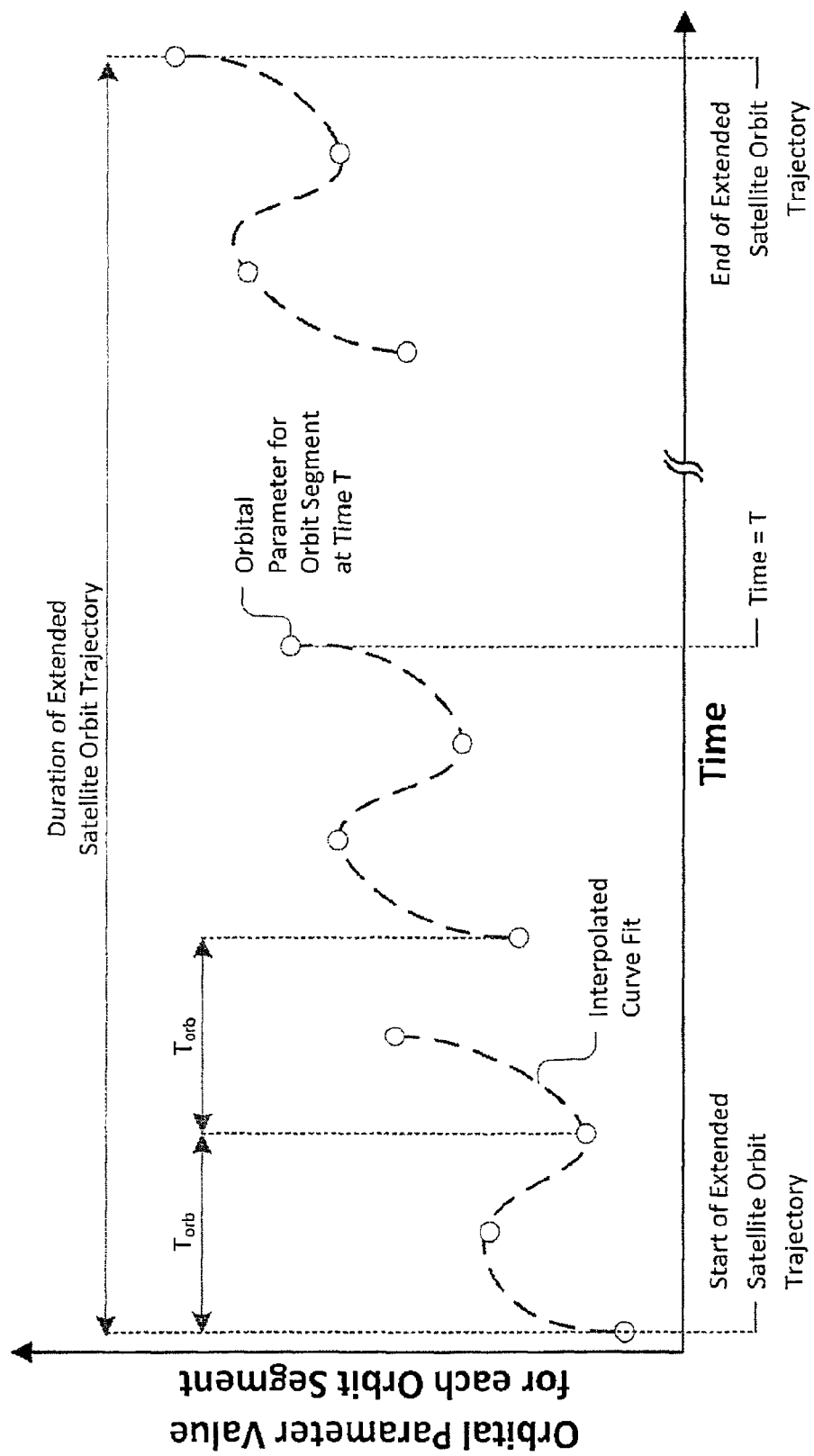
FIG. 2 is a graph showing the curve fitting method of the present invention which uses orbital parameter interpolation.

The approach, shown in FIG. 2, as applied in the present arrangement uses curve fitting and interpolation techniques to compress long-term satellite orbit information. An extended satellite orbit trajectory which spans a duration of multiple orbital periods is represented as a series of orbit segments, wherein each orbit segment is described by a set of orbital parameters that are valid for an orbit segment interval. Each orbital parameter is considered individually as a series of points that change over time. The curve fitting is performed on smaller sets of the points rather than performing one large curve fit over all of the points in the extended satellite orbit trajectory. In this way, a plurality of fitted curves is used to span the entire duration of a given long-term orbit prediction. The coefficients that are the result of the curve fits are compressed in a manner that takes advantage of the underlying physical properties of satellite orbits.

Generating Orbital Parameters

To generate the orbital parameters for a given satellite, an iterative least-squares best-fit algorithm is typically used to minimize the difference between the satellite's orbital trajectory to be modelled, which may take the form of a time series of position coordinates, and the modelled orbital trajectory represented by the orbital parameters being generated.

Since said orbital parameters represent a specific portion of a satellite's trajectory and not necessarily a complete orbit; the portion of the satellite trajectory being represented by said orbital parameters is referred to as an orbit segment. As such, the period of time for which said orbital parameters represent a given satellite's trajectory is referred to as the orbit segment interval. The orbital parameters that describe the orbit segment are associated with a time T at which the parameters are applicable.

As mentioned previously, a trade off must be made between the duration of a given orbit segment interval and the level of accuracy to which the orbital parameters can describe an orbit segment during said orbit segment interval. In order to maintain a fitting accuracy on the order of several metres, orbit segment intervals used for modelling Medium-Earth Orbits (MEO) may vary between 1 and 24 hours. More typically for orbits of GNSS satellites, an orbit segment interval of 4-8 hours is used. Because the perturbing forces that act on Low-Earth Orbit (LEO) satellites are much stronger, the typical orbit segment intervals for LEO satellites may vary on the order of several minutes up to several hours.

Conversely, geosynchronous and High-Earth orbit satellites experience weaker perturbing forces as compared to GNSS satellites; as such, typical orbit segment intervals for said satellites may vary from several hours up to several days. Moreover, for highly elliptical orbits of satellites such as those used in the Japanese Quasi-Zenith Satellite System (QZSS) and the Sirius Satellite Radio constellation, the orbit segment intervals used may vary depending on the distance between the orbit segment and the foci of the orbit (i.e. the Earth's centre of mass). To this end, an orbit segment nearest to the perigee may have a shorter orbit segment interval as compared to the orbit segment nearest to the apogee. In addition, a given level of fitting accuracy may be maintained for a longer orbit segment interval by making use of additional perturbation parameters not described by the ICD-GPS-200. Conversely, a subset of the ICD-GPS-200 orbital parameters may be used for shorter orbit segment intervals without degrading the overall accuracy of the modelled orbit segment.

Another factor that can influence the accuracy of a modelled orbit segment is the numerical precision of the orbital parameters used to represent the orbit segment. In the case of GNSS orbits, many of the orbital parameters are extremely sensitive to small deviations caused by numerical errors. As a result, any small deviations in the GNSS orbital parameters, whether they are caused by numerical errors or otherwise, may result in gross positioning errors in the corresponding orbit segment. Because of this, the numerical precision needed for storing and distributing GNSS orbital parameters is very high; the required numerical precision for GPS orbital parameters is specified by the ICD-GPS-200. As noted in the ICD-GPS-200, the numerical precision required for each individual GPS orbital parameters may vary greatly from one another.

In the arrangement described herein, long-term orbits of satellites generally refer to durations spanning one or more hours to several weeks. More specifically, in the case of MEO satellites such as GNSS satellites, long-term orbits refer to durations that span over more than one orbit segment interval. In the instance where the long-term orbit of a given GNSS satellite span over several weeks, many orbit segments are needed to represent the orbit with an accuracy level better than several metres. For example, if the full set of orbital parameters as specified by the ICD-GPS-200 were to be directly transmitted without compression for 32 satellites at a rate of once every four hours over a period of 28 days, a total of more than 230 kilobytes are needed; therefore, it may be undesirable to distribute long-term orbit information by directly transmitting the orbital parameters due to limitations in the communication bandwidth. To this end, the arrangement described herein provides an alternative arrangement to distribute the long-term orbit information using significantly less bandwidth as compared to directly distributing the orbital parameters for said long-term orbit information.

Compression with Curve Fitting

A variety of data compression techniques can be used to compress orbital parameters with varying degrees of effectiveness. These techniques may include data differencing and modelling of the harmonic and secular trends. Although data differencing can be used effectively to compress parameters with stationary processes, many orbital parameters are non-stationary and cannot be efficiently compressed by data differencing techniques. Alternatively, harmonic and secular trends present over many orbit segments may be modelled using curve fitting and interpolation techniques, where interpolation is a special case of curve fitting in which the curve must pass through all data points used for the fit.

The arrangement described herein uses a plurality of fitted curves to model the change in an orbital parameter over the duration of an extended satellite orbit trajectory. By using this method, the fitted curve can accurately represent a given orbital parameter over a small number of orbit segments; this fitted curve also requires fewer coefficients to describe the orbital parameters being modelled and each coefficient is less sensitive to numerical instabilities that exist with high-order polynomial curve fitting. In practical terms, the number of orbit segments used in each curve fit should be no more than 8. Also, a number of orbit segments fewer than 2 is a trivial case that does not produce a curve fit.

For the interpolation of orbital parameters over time, a number of mathematical models can be used either individually as standalone functions or in combination with multiple functions; these models include polynomial, spline, rational, and trigonometric functions in the time domain. Since different orbital parameters may exhibit unique behaviour that make them more suited to be modelled by a particular mathematical function, it may be desirable to use different functions for interpolation based on the orbital parameter used.

One added benefit to the above approach of precise, short-term curve fitting of orbital parameters is that many orbital parameters have harmonic trends that coincide closely with their orbital period. Because of this, if the orbit segment interval is chosen so that the orbital period of a given satellite coincides with an integer number of orbit segment intervals, the coefficients of the fitted curves that describe a given orbital parameter will be very similar from one orbital period to the next. By exploiting this behaviour, the coefficients that describe each fitted curve can then be effectively compressed using differential data compression.

The arrangement described herein takes advantage of the intrinsic properties of how orbital parameters behave over time in order to compress the orbital parameters for distribution in an efficient manner. In general, the orbital parameters described by the ICD-GPS-200 exhibit deterministic properties with harmonic and secular trends when observed over a plurality of orbit segments; as such, the harmonic and secular trends can be exploited to maximize the data compression ratio of the orbital parameters. Doing so allows the arrangement described herein to minimize the amount of data needed when distributing long-term orbit information.

Furthermore, data compression can be categorized as being either lossless or lossy. The arrangement described herein makes use of lossy data compression techniques in a manner that allows the long-term orbit information to be transmitted with a minimum amount of data; at the same time, the arrangement described herein also ensures degradation in accuracy of the modelled orbit segments caused by data compression loss is kept at an acceptable level. This is achieved in part by adjusting the numerical precision of both the original uncompressed form of the orbital parameters as well as the compressed form of the orbital parameters.

Figure 3:
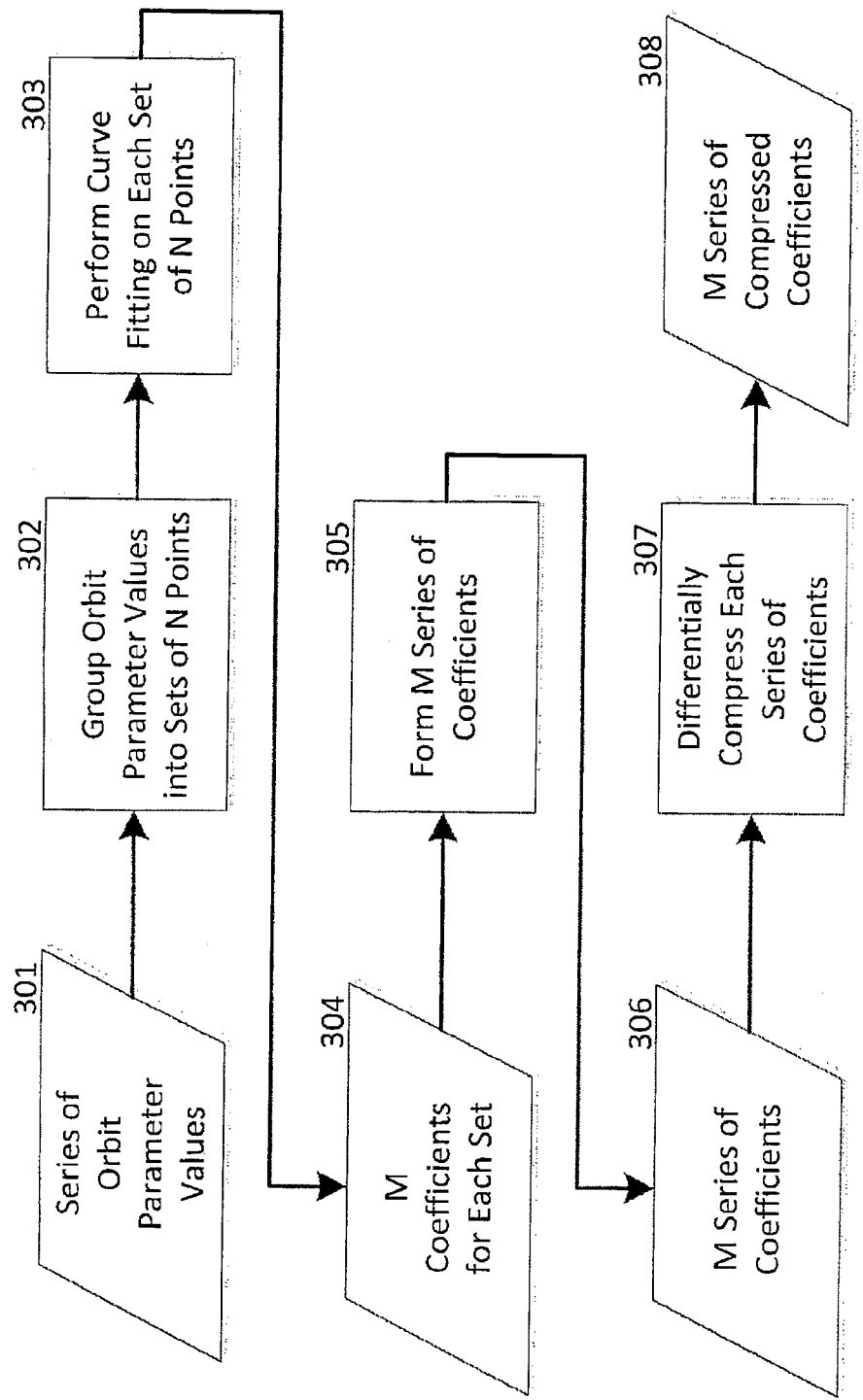
FIG. 3 shows the process of generating and encoding curve fit coefficients.

The arrangement described herein, shown in FIG. 3, thus provides a method for encoding an extended satellite orbit trajectory wherein the full duration of the trajectory is represented as a series of orbit segments. Each orbit segment is described by a set of orbital parameters which are valid for an orbit segment interval.

Each orbital parameter is considered individually as a series 301 of points that change over time, where the point is the value that the parameter takes at the time T at which the parameter is applicable for an orbit segment. FIG. 2 shows how an individual orbital parameter has a point for each orbit segment and may change over time.

A plurality of curve fits is performed over sets of the points 302 representing the orbital parameter. In the example shown in FIG. 2, the curve fit is performed on a set of 4 points, and repeated for other sets of 4 points until all of the orbit segments are represented in at least one of the curve fits. In the example, each curve fit results in 4 coefficients to be encoded. In general however, each curve fit may be performed over sets of N points 303, where N is no less than 2 and no greater than 8, and results in M coefficients 304, where M is no less than 2 and no greater than 8.

Each of the curve fit coefficients is then formed into a series of the same coefficient from all of the curve fits 305. In the example of FIG. 2, the 4 coefficients are formed into 4 series, one series containing all values of the first coefficient, then another series of the second coefficient, and then series for the third and fourth coefficients. In general there will be M series of coefficients formed 306.

Then for each of the series of coefficients, the members in the series are compressed with differential compression 307 or another means of compression, yielding M series of compressed coefficients 308.

In the example of FIG. 2, the duration between the time T of each point value of the orbital parameter is constant at one half of a satellite orbital period $T_{orb}$. Thus, the first point of any two adjacent curve fits will be separated by duration of $2*T_{orb}$. In general, the duration between the time T of each point can be variable and the sets of points formed for the curve fits need not be in strict order of increasing time. But the compression of the curve fit coefficients is improved if the relative time between points used for one curve fit is the same as the relative time between points in each of the other curve fits, and also that the time between the first point of any two curve fits is near an integer L number of satellite orbital periods, say $L*T_{orb} \pm 0.25*T_{orb}$.

In the frequency domain, wavelets and Fourier series can also be used. For example, the Whittaker-Shannon interpolation method can be used to represent the behaviour of a given orbit parameter in the frequency domain.

In addition to selecting a mathematical function that is well suited for the behaviour of a given orbital parameter, there are additional characteristics that make certain functions more suitable for mobile devices. One of these characteristics include the ability to recursively compute a set of polynomials or the ability to use predefined polynomials; examples of this can be found in Chebyshev, Legendre, Hermite, and Laguerre polynomials.

Other factors that influence the selection of a function candidate for modelling orbital parameters include the computational load required to generate such functions; for example, the use of trigonometric functions for interpolation can greatly increase the computational load on a low-power mobile device.

Lastly, numerical stability is also a key consideration in the selection of candidate functions for the interpolation of orbital parameters; by using numerically stable functions, fewer bits are needed to accurately distribute the coefficients which represent a given curve.

Extended Ephemeris Service

In the arrangement described herein, an extended ephemeris service generates the extended ephemeris package comprising satellite orbit trajectories and clock corrections over a prediction duration that is longer than the validity interval of typical broadcast ephemeris. Orthogonal basis function coefficients combined with the satellite clock corrections are encoded into an extended ephemeris package. The range of values and resolution of each encoded field may be set to achieve a predefined accuracy requirement for the decoded values. To achieve further compression, variations in the orthogonal basis function coefficients for the satellite orbital parameters may be encoded using differential compression.

The extended ephemeris service then distributes the extended ephemeris package to one or more client devices that perform GNSS processing. In one embodiment, the package is distributed by way of a communication medium. The communication medium may be a wired or wireless communication link, a physical storage device such as a memory card, or any other means of data transfer.

A client device obtains the extended ephemeris package and stores the information. The client device first decodes the satellite clock corrections and orthogonal basis function coefficients, and then extracts the orbit segments of interest. The current ephemeris is then provided to a GNSS process as required for processing.

Further objects and advantages of the present invention will be clear to those with skill in the art through the detailed description of a preferred embodiment below along with the described figures.

In one embodiment of the present invention, the extended ephemeris service transforms the predictions from the extended ephemeris data store into an extended ephemeris package that is suitable for distribution to GNSS client devices. For each satellite orbit trajectory that is predicted, the service may represent the trajectory as a series of orbital parameters. To minimize and limit the bandwidth demand on the communication link, the extended ephemeris service models the orbital parameters using orthogonal basis functions. The coefficients of the orthogonal basis functions in addition to the clock correction model coefficients are encoded and packed in a manner that expedites transmission along with efficient storage and retrieval at the client device.

Figure 4:
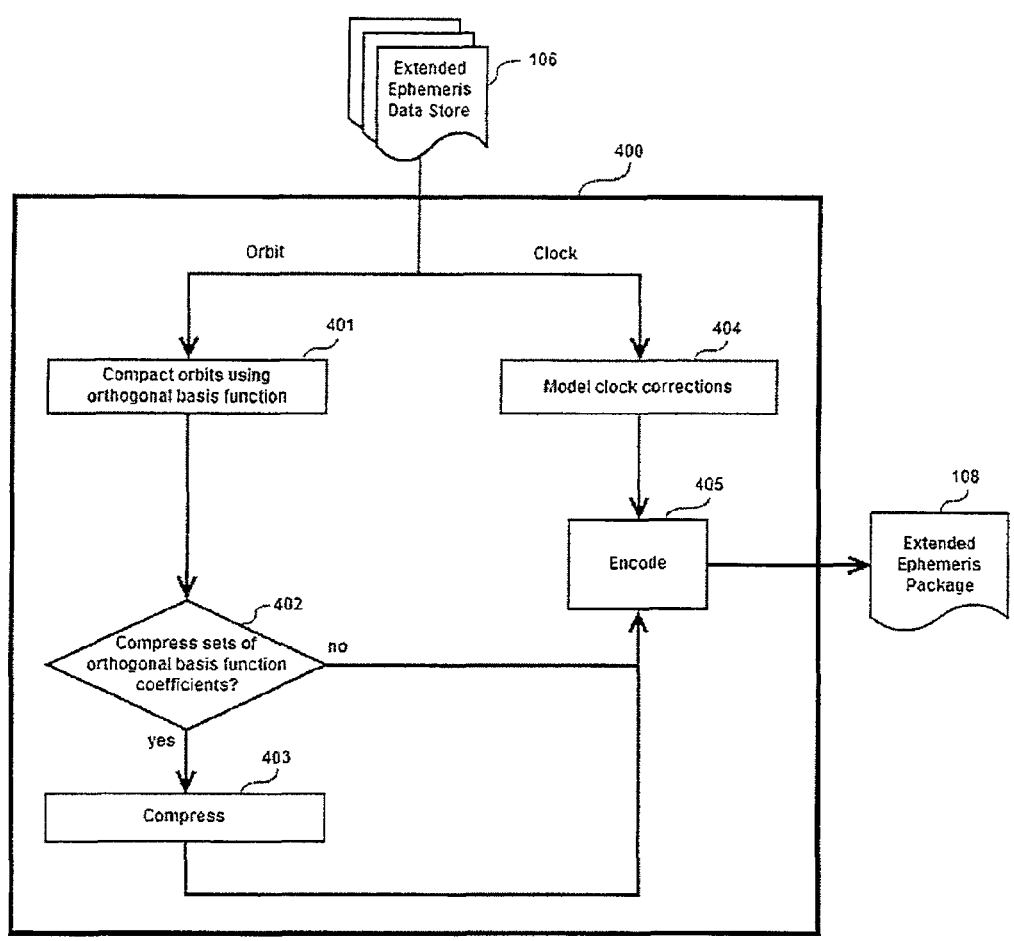
FIG. 4 shows one embodiment of the extended ephemeris service 400 from FIG. 1 using orthogonal basis functions as one of the more general concepts described in relation to FIG. 2.

FIG. 4 describes an embodiment of the extended ephemeris service 400 from FIG. 1. The extended ephemeris service obtains the predicted satellite orbit trajectories, clock corrections and other prediction information from the extended ephemeris data store 106. The extended ephemeris service may transform the predicted satellite orbit trajectories into a compact representation using orthogonal basis functions 401 to model orbital parameters.

In this embodiment, the orbit trajectories from the extended ephemeris data store may be represented by a tabular format of satellite X, Y, and Z position coordinates, and optionally velocity and acceleration vectors. In a tabular format, satellite positions between epochs can be interpolated so that the predicted orbit trajectories can be represented with a high degree of fidelity for the full prediction duration. However, a tabular representation may require an undesirably large data package size and may require too much memory and processor resources at a client device.

A satellite orbit may be represented in a more compact form by using a set of orbital parameters. One set of orbital parameters which can be encoded in a compact form is the Keplerian broadcast ephemeris model used in the ICD-GPS-200. However, a set of orbital parameters can only represent an orbit accurately over a limited validity interval. Therefore, the extended ephemeris service may represent the satellite orbit trajectory as a series of orbit segments that cover the full prediction duration, where each orbit segment is represented by a set of orbital parameters. In other embodiments, the extended ephemeris data store may represent the orbit trajectories in a format other than the tabular format. Regardless, the extended ephemeris service may still transform satellite orbit trajectories into series of orbit segments represented by orbital parameters.

Due to the temporal trend of satellite orbits, systematic variations of individual orbital parameters over several orbit segments are well-suited to being modelled by orthogonal basis functions through curve fitting as previously described, further reducing the bandwidth and memory requirement for the extended ephemeris package. Therefore, instead of encoding each orbit segment in the series as an individual set of orbital parameters, orthogonal basis function coefficients may be generated to represent an orbital parameter across multiple sets of orbit segments. One example of orthogonal basis functions that may be used for modelling sets of orbit segments are the Chebyshev polynomials.

The extended ephemeris service may then optionally compress the sets of orthogonal basis function coefficients. The harmonic nature of orbits leads to correlation between the orthogonal basis function coefficients which model an orbital parameter over different orbit segments. In FIG. 4, if a compression technique is utilized 402, the service may make use of this correlation to reduce the bandwidth and memory requirement. In block 403, differential compression may be used on the orthogonal basis function coefficients modelling some or all orbital parameters. For example, the first set of coefficients for a parameter may stay the same, while the remaining sets are differenced with regard to the preceding set. The extended ephemeris service may be configured such that the time between curve fits maximizes the compression ratio of the extended ephemeris package.

In block 404, the predicted clock corrections of each satellite may be modelled using conventional methods, for example the af0, af1, and af2 coefficients used in the GPS broadcast ephemeris.

The orthogonal basis function coefficients and the clock correction coefficients may be encoded in block 405. The number of bits required to encode each value is a function of the numerical precision and range of values necessary to meet the required accuracy for GNSS processing. To achieve higher accuracy, a higher precision and a greater number of bits must be used. However, this leads to a smaller compression ratio and a bigger extended ephemeris package 108 which increases the bandwidth and memory requirement to transmit the extended ephemeris package 108 and store it on the device. The extended ephemeris service may adjust the numerical precision to achieve a predetermined accuracy requirement. The extended ephemeris service may also use a variable number of encoded bits to fit the range of values necessary for the current set of coefficients that may be smaller for certain orbital conditions.

In some embodiments, the extended ephemeris package 108 may include other useful prediction information such as—but not limited to—ionospheric model coefficients, satellite health information, and time group delay. Also, in some embodiments, the extended ephemeris package may be encrypted to prevent unauthorized access.

The resulting extended ephemeris package 108 may then be transmitted to the client device 500 using some method of data transfer, such as a wired or wireless communication link.

Client Device

GNSS positioning computations use measurements taken from multiple GNSS satellite signals and the current ephemeris for each satellite used in the position solution. The current ephemeris refers to the ephemeris—some representation of the satellite trajectory and clock correction—which is applicable for the time of interest (i.e. the time of the measured satellite signal). In the arrangement described herein, the current ephemeris may be created from the extended ephemeris package.

Figure 5:
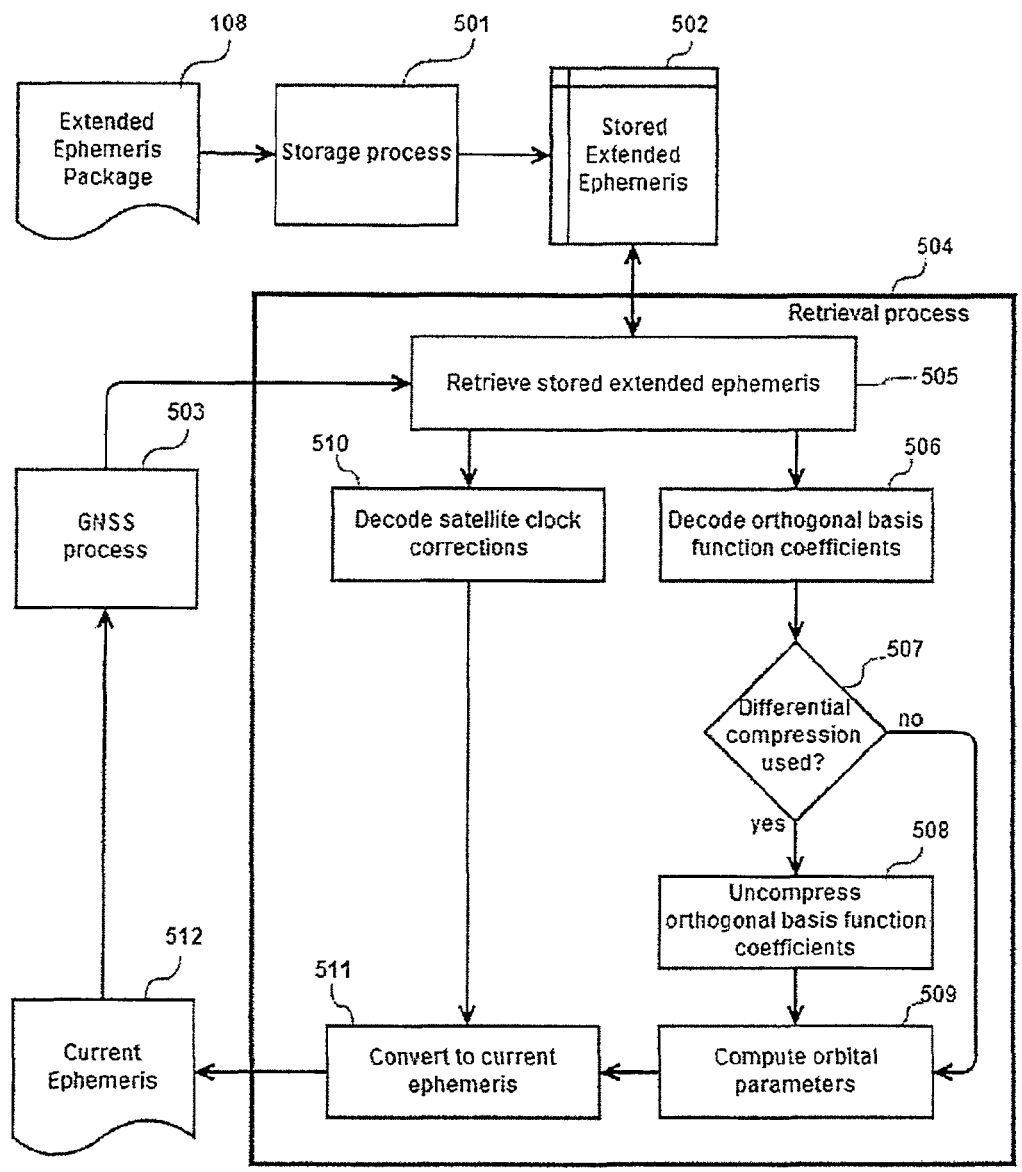
FIG. 5 is an example client device of this embodiment.

In an embodiment of the invention, one or more client devices 500 (FIG. 1) may obtain the extended ephemeris package 108 from the extended ephemeris service and provide the current ephemeris to a GNSS process. FIG. 5 details an example client device of this embodiment.

In the example embodiment, a storage process 501 may obtain the extended ephemeris package 108 from the extended ephemeris service by way of a communication medium. The communication medium may be a wired or wireless communication link, a physical storage device such as a memory card, or any other means of data transfer. The storage process may then store the extended ephemeris information locally. In this embodiment, the format of the stored extended ephemeris 502 may be unaltered from the extended ephemeris package as obtained. Alternatively, the extended ephemeris package may be partially decoded or processed before storing for more efficient retrieval at the time when current ephemeris is required. If the extended ephemeris package has been encrypted by the extended ephemeris service, the client device may decrypt the package before decoding.

As the extended ephemeris information is now stored locally, current ephemeris may be created for GNSS processing without further data transfer from the extended ephemeris service while the stored extended ephemeris is still valid. However, a more up-to-date extended ephemeris package may be obtained to replace or update the stored extended ephemeris before its validity has ended.

The example client device may include a GNSS process 503 which is triggered on demand to calculate the position of the client device. Demand may be initiated by a user, an automated process, or an external event.

The GNSS process may initiate a retrieval process 504 to create current ephemeris for all navigation satellites available in the stored extended ephemeris, or for a desired subset of satellites. The retrieval process may retrieve 505 the stored extended ephemeris and decode 506 the orthogonal basis function coefficients. If the orthogonal basis function coefficients have been compressed with differential compression 507 by the extended ephemeris service, the retrieval process may un-compress 508 the orthogonal basis function coefficients. The retrieval process may then compute 509 the orbital parameters of the orbit segments which are valid for the time of interest. The retrieval process also may decode 510 the satellite clock corrections from the retrieved stored extended ephemeris. The computed orbital parameters and decoded satellite clock corrections for the time of interest may then be converted 511 to the current ephemeris 512 and provided to the GNSS process 503 in the necessary format. The format of the current ephemeris may be a common industry standard, proprietary to a third-party GNSS processor, or unique to the client device system.

In an alternative embodiment, one or more stages of the retrieval process 504 may be performed by the storage process 501 to optimize for response time and/or client device resource utilization when the GNSS process 503 requests current ephemeris.

In another embodiment, the GNSS process 503 may comprise dedicated GNSS receiver components and circuitry on the same hardware platform as the storage process and retrieval process. Alternatively, the GNSS process may be part of a separate device.

The invention claimed is:

1. A method for encoding an extended satellite orbit trajectory comprising:
    representing the orbit trajectory as a series of orbit segments wherein each orbit segment is described by a set of orbital parameters valid for an orbit segment interval;
    creating for each orbital parameter a series of points representing the values that said parameter takes at all times T at which the parameter is applicable for an orbit segment;
    performing for each orbital parameter a plurality of curve fits over the series of points for said parameter wherein each curve fit is performed on a set of N points where N is no less than 2 and no greater than 8, and where each curve fit results in a set of M coefficients where M is no less than 2 and no greater than 8;
    forming for the said coefficients, M series of curve fit coefficients such that all instances of the same coefficient generated from each of the sets of N points is grouped into the same series;
    and carrying out an encoding step for encoding each series of curve fit coefficients with compression.

2. The method according to claim 1 wherein each series of curve fit coefficients is compressed with differential compression.

3. The method according to claim 1 wherein the relative times between the points of any one of the sets of N points is the same as the relative times between the points of all of the other sets of N points.

4. The method according to claim 1 wherein for any two of the sets of N points, the time difference between the first point of each set can be expressed as $L*T_{orb} \pm (0.25*T_{orb})$, where L is an integer and $T_{orb}$ is the orbital period of the satellite.

5. The method according to claim 1 wherein for any two of the sets of N points, the time difference between the first point of each set can be expressed as $L*T_{orb} \pm (0.1*T_{orb})$, where L is an integer and $T_{orb}$ is the orbital period of the satellite.

6. The method according to claim 1 wherein for any two of the sets of N points, the time difference between the first point of each set can be expressed as $L*T_{orb}$, where L is an integer and $T_{orb}$ is the orbital period of the satellite.

7. The method according to claim 1 wherein one of the characteristics of the encoding step includes the ability to recursively compute a set of polynomials or the ability to use predefined polynomials.

8. The method according to claim 7 wherein the encoding step uses Chebyshev, Legendre, Hermite, or Laguerre polynomials.

9. The method according to claim 1 wherein for the curve fits of orbital parameters over time, a number of mathematical models can be used either individually as standalone functions or in combination with multiple functions.

10. The method according to claim 9 wherein the models include polynomial, spline, rational, and trigonometric functions in the time domain.

11. The method according to claim 9 where in the frequency domain, wavelets and Fourier series can also be used.

12. The method according to claim 11 wherein the Whittaker-Shannon interpolation method can be used to represent the behaviour of a given orbit parameter in the frequency domain.

13. The method according to claim 1 wherein one or more orbital parameters are modelled as multiple sets of coefficients of orthogonal basis functions.

14. The method according to claim 13 wherein the orthogonal basis functions are Chebyshev polynomials.

15. The method according to claim 1 wherein the curve fit coefficients and predicted clock corrections are encoded using a variable number of encoding bits to adjust the range of values to the orbit trajectory being modelled.

16. The method according to claim 1 wherein the curve fit coefficients and predicted clock corrections have a variable precision so as to provide different precisions each of which meets a defined service level.

17. The method according to claim 1 wherein the orbital parameters are in the form of parameters as described by the ICD-GPS-200, or a subset thereof.

18. The method according to claim 1 wherein satellite is one of a plurality of satellites which are arranged for GNSS processing.

19. A method for providing a compact extended ephemeris package for a satellite, comprising:
    obtaining for said satellite orbit trajectory and clock corrections predicted into the future;
    and encoding each orbit trajectory using the method of claim 1 along with the clock corrections into an extended ephemeris package for distribution to client devices.

20. The method according to claim 19 wherein the extended ephemeris package from the extended ephemeris service is provided to a plurality of client devices, including the further steps comprising:
- decoding the curve fit coefficients and predicted clock corrections from the extended ephemeris package;
- computing the orbital parameters from the decoded curve fit coefficients, where the orbital parameters are from orbit segments applicable to a time of interest;
- and converting the orbital parameters and clock corrections for the time of interest into an ephemeris.

21. An apparatus comprising a client device which uses a compact extended ephemeris package for a plurality of satellites comprising:
- a component for receiving the extended ephemeris package wherein the package contains extended satellite orbit trajectory encoded by the method of claim 1;
- a component for decoding the encoded extended satellite orbit trajectory;
- a component for computing the orbital parameters from the decoded extended satellite orbit trajectory, where the orbital parameters are from orbit segments applicable to a time of interest;
- and a component for converting the orbital parameters and clock corrections for the time of interest into an ephemeris.

22. The method according to claim 5 wherein the orbital parameters are in the form of parameters as described by the ICD-GPS-200, or a subset thereof.

* * * * *